Dec. 19, 1967 — M. A. MANDELKO — 3,358,730
TIRE HANDLING MACHINE
Original Filed Aug. 31, 1962 — 3 Sheets-Sheet 1

INVENTOR
MELVIN A. MANDELKO
BY
Dick, Zarley & Henderson
ATTORNEYS

INVENTOR
MELVIN A. MANDELKO
BY
Dick, Zarley + Henderson
ATTORNEYS

Dec. 19, 1967     M. A. MANDELKO     3,358,730
TIRE HANDLING MACHINE
Original Filed Aug. 31, 1962     3 Sheets-Sheet 3
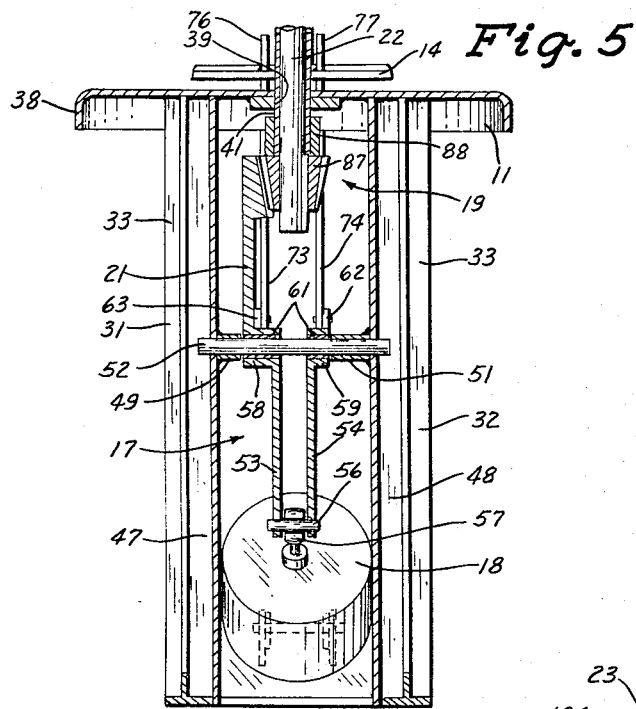
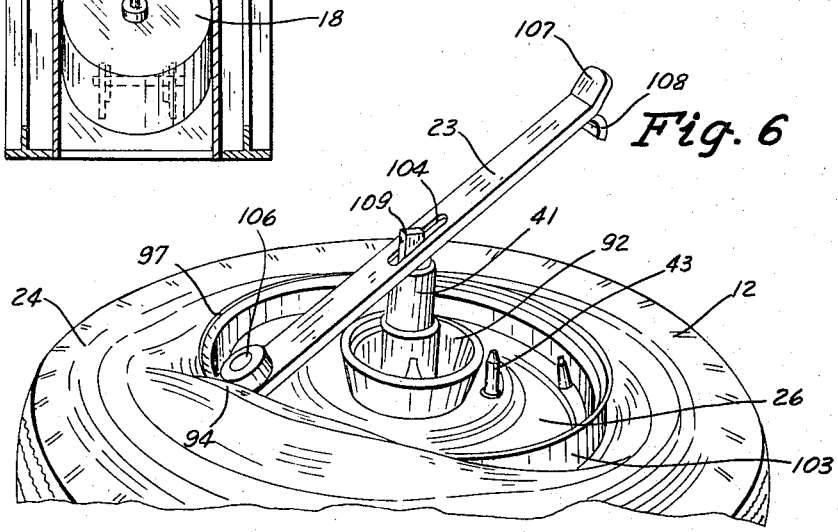
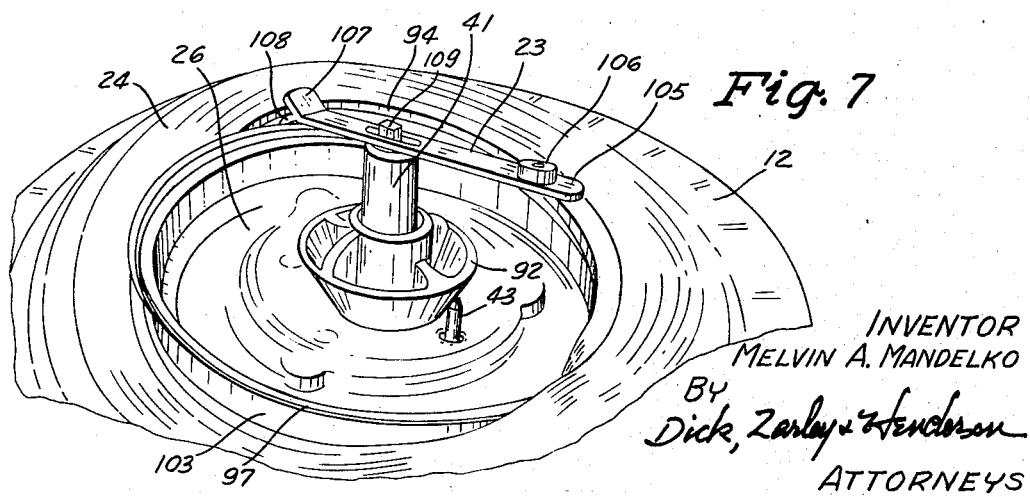
INVENTOR
MELVIN A. MANDELKO
BY
Dick, Zarley & Henderson
ATTORNEYS United States Patent Office 3,358,730
Patented Dec. 19, 1967

3,358,730
TIRE HANDLING MACHINE
Melvin A. Mandelko, 1231 6th Ave. S.,
Fort Dodge, Iowa 50501
Continuation of application Ser. No. 220,701, Aug. 31, 1962. This application Sept. 26, 1966, Ser. No. 582,166
1 Claim. (Cl. 157—1.17)

This application is a continuation of application Ser. No. 220,701, filed Aug. 31, 1962 and now abandoned.

This invention relates to tire handling machines and more particularly to a machine sequentially operable to simultaneously break both upper and lower tire beads of a tire and wheel assembly and to completely remove one bead from the rim without changing the position of the tire and wheel assembly.

It is an object of this invention to provide an improved tire handling machine comprising a novel combination of elements for demounting and mounting a conventional automotive or like tire with respect to a wheel.

With the advent of the drop center wheel rim, the tire changing machine utilizing a bead breaking shoe came of age. Numerous improvements in these machines have been developed from the standpoint of safety to the tire, in preventing damage to the beads as they are broken and removed from the rim, and with respect to expediting the mounting and demounting of the tire on and from the wheel rim. This invention is directed primarily to the latter efforts.

It is another object, therefore, of the invention to provide a machine capable of expediting tire mounting and demounting as compared to present day tire handling machines.

Still another object of this invention is to provide a tire handling machine capable of simultaneously breaking both upper and lower beads of a tire from the wheel rim.

Yet another object of this invention is to provide a tire handling machine capable upon a single operation of a power device of simultaneously breaking both beads of a tire, and immediately thereafter by another single operation of the power device of effecting a further and more extensive withdrawal of one of the beads from the rim.

A further object of this invention is to provide a tire handling machine including linkage-operated upper and lower bead breaking shoes operably combined with gear-rotated upright shaft means adapted for use with a tire mounting and demounting tool.

Another object of this invention is the provision of a tire handling machine as characterized hereinbefore which is operated by a fluid actuated piston and cylinder device operably connected to both the linkage and the gear arrangement.

Still another object of this invention is the provision of such a machine which includes a device for yieldably limiting the movement of the linkage to prevent damage to the bead breaking elements.

Yet another object of this invention is to provide a tire handling machine capable of accomplishing the above mentioned objectives, which is economical to manufacture, rugged in construction, and effective in use.

These objects, and other features and advantages of this invention, will become clearly apparent upon reference to the following description and the accompanying drawings, wherein:

FIG. 5 is a sectional view taken along the line 5—5 in FIG. 2; and

FIGS. 6 and 7 are fragmentary perspective views of the top of the machine assembled with a tire and wheel, showing the cooperative use of a combination tire mounting and demounting tool in respectively demounting and then mounting the tire relative to the wheel.

Figure 1:
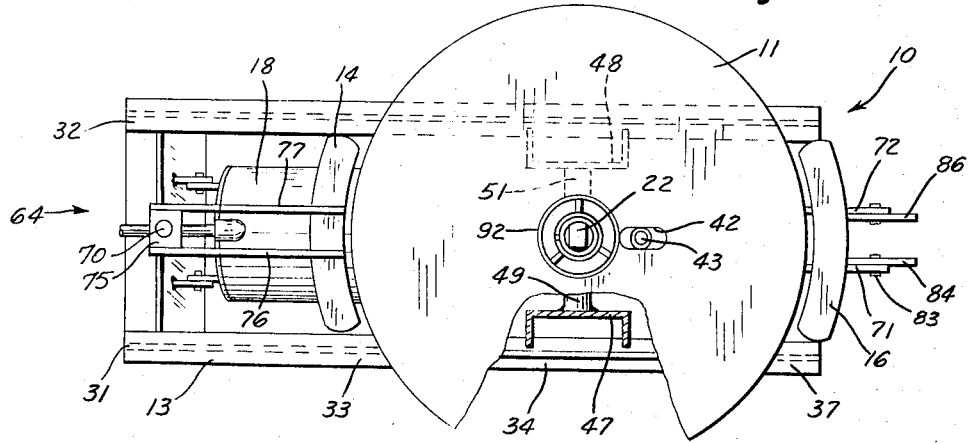
FIG. 1 is a top plan view of a preferred embodiment of the tire handling machine of this invention, with certain parts broken away for clarity of illustration.
Figure 2:
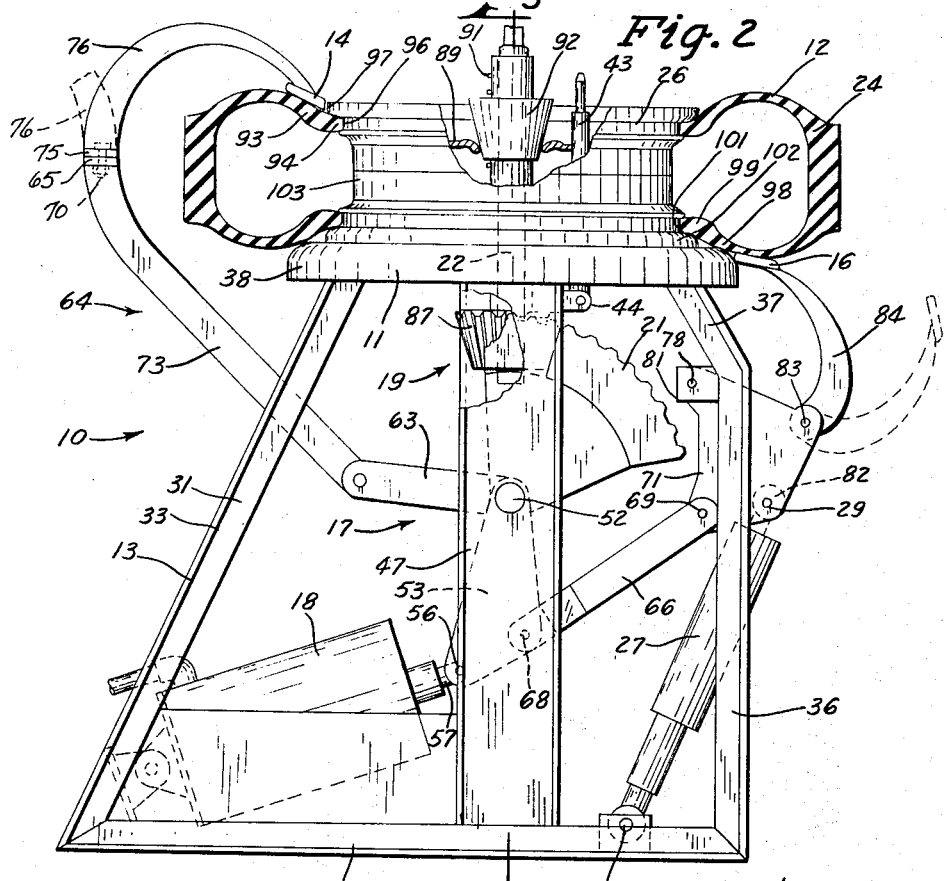
FIG. 2 is a side elevational view of the machine, shown assembled with a tire and wheel assembly, the tire shown in cross section, certain parts broken away and others shown in dotted lines and alternate positions.

Referring now to the drawings, the tire handling machine of this invention is indicated generally at 10 in FIGS. 1 and 2 and comprises a horizontally disposed table 11 for supporting a conventional tire and wheel assembly 12 (FIG. 2), a ground engaging framework 13 for supporting the table 11, and a pair of upper and lower bead breaking shoes 14 and 16, respectively.

The machine includes further a linkage arrangement, indicated generally at 17 in FIG. 2, for simultaneously operating both shoes 14 and 16, and a fluid-actuated piston and cylinder assembly 18 for actuating the linkage 17. Operatively connected to the linkage 17 is an upstanding shaft unit, indicated generally at 19 in FIG. 2 and which includes a gear segment 21 movable simultaneously with the shoes 14 and 16 to effect rotation of a shaft 22 rotatably mounted in the framework 13.

As will be described hereinafter, the shaft 22 is useable in connection with a combination tire mounting and demounting tool 23 (FIGS. 6 and 7) to either remount the tire 24 on the wheel 26, or to demount or remove the tire therefrom after the bead or beads have been broken. A shock absorber 27 (FIGS. 2 and 4) pivotally connected at 28 to the framework 13 is also pivotally connected at 29 to the linkage 17 and is operable to limit the operating movement of the linkage 17.

More specifically, the framework 13 includes a pair of parallel angle irons 31 and 32 (FIGS. 1 and 2) each having a straight inclined portion 33, a straight ground engaging portion 34, a straight upstanding portion 36, and an inwardly and upwardly inclined portion 37. The upper ends of the portions 33 (FIG. 5) and 37 are secured to the underneath surface of the table 11.

Figure 4:
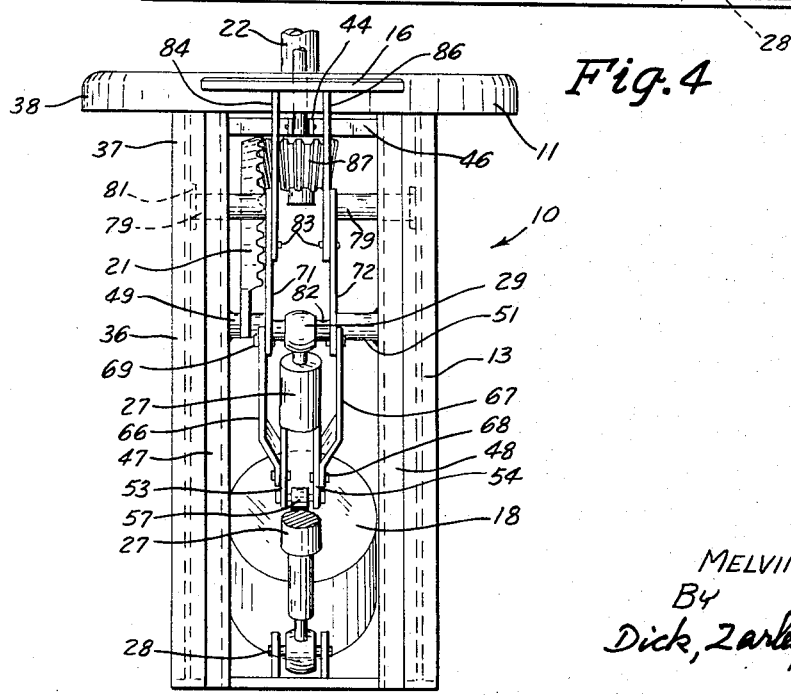
FIG. 4 is a fragmentary end elevational view of the machine without the tire and wheel assembly.

The table 11 is circular and has a depending flange 38 whereby to prevent injury to the tire 24. The center of the table 11 has a reinforced opening 39 (FIG. 5) formed therein for receiving a sleeve 41 for the shaft 22. It also is provided with an opening 42 (FIG. 1) radially offset from the center opening 39 for receiving a wheel locking pin 43 (FIG. 2). The lower end of the pin 43 is pivotally connected by a pair of ears 44 to a horizontally disposed bar 46 (FIG. 4).

The framework 13 is completed by a pair of parallel, upright U-shaped members 47 and 48 (FIGS. 1 and 4) mounted centrally of the machine 10 and in transversely spaced relation. The bar 46 (FIG. 4) is secured to and extends between the upright members 47 and 48. Also disposed horizontally between and secured to the upright members 47 and 48 are a pair of sleeves 49 and 51 (FIG. 5) through which is journaled a pivot shaft 52.

The pivot shaft 52 is a part of the linkage 17, which includes further a parallel pair of pivot plates 53 and 54 (FIG. 5). The lower ends of the plates are pivotally mounted on a pivot pin 56 (FIGS. 4 and 5) secured to the exposed end of the piston rod 57 for the piston and cylinder assembly 18. The upper ends of the plates 53 and 54 are integral with transversely aligned hubs 58 and 59 (FIG. 5) rotatably mounted on bushings 61 on the shaft 52.

A pair of parallel links 62 and 63 (FIGS. 5 and 2) are integral with the hubs 58 and 59, respectively, and extend normally horizontally away from the hubs toward what shall be termed for convenience the front 64 of the machine. Integral with the left hub 58 as viewed in FIG. 5 is the quarter gear segment 21 disposed in a normally vertical position and adapted to be rotated about the pivot shaft 52 upon pivotal movement of the pivot plates 53 and 54. Use of the gear segment 21 will be described in detail hereinafter.

At the outer free ends of the links 62 and 63 a pair of elongated and upwardly curved link arms 73 and 74 (FIGS. 2 and 5) are mounted in parallel transverse alignment. Their upper ends are connected by a plate 65 on which is rotatably mounted as by a vertical pin 70 another plate 75. The latter plate is secured to and extends between the lower ends of a pair of curved bars 76 and 77, and the upper bead breaking shoe 14 is secured to the outer free ends of the bars 76 and 77 as illustrated in FIGS. 1 and 2.

The linkage 17 includes further another pair of parallel links 66 and 67 (FIGS. 2 and 4) the lower ends of which are pivotally connected by pins 68 to the pivot plates 53 and 54 at points thereon intermediate the pivot shaft 52 (FIG. 2) and the pivot pin 56 connection. The upper ends of the links 66 and 67 are pivotally connected at 69 (FIG. 2) to a pair of rocker plates 71 and 72 (FIGS. 2 and 4). The latter plates are themselves parallel, transversely aligned, and pivotally connected by a pair of pivot pins 78 (FIG. 2) rotatably mounted in a pair of sleeves 79 (FIG. 4) secured to ears 81 extended from the framework portions 36.

As best illustrated in FIGS. 2 and 4, the rocker plates 71 and 72 are pivotally connected by a shaft 82 (FIG. 4) extended therebetween to the upper end 29 of the shock absorber 27. The rocker plates are also pivotally connected by pins 83 to a pair of upwardly and forwardly curved bars 84 and 86 (FIGS. 2 and 4) at the upper ends of which is secured the lower bead breaking shoe 16.

Referring particularly to FIG. 5, the gear segment 21 is shown in mesh with a bevel gear 87 keyed to the lower end of the shaft 22. The shaft 22 is rotatably within the sleeve 41 which has secured thereto a tubular member 88. The sleeve 41 extends through the inner panel 89 (FIG. 2) of the wheel rim 26 and has a rack segment 91 secured thereto, whereby a commercially available centering and wheel hold-down cone member 92 can be threaded downwardly on the sleeve 41 and against the wheel rim panel 89. The wheel rim 26 is thereby centered relative to the table 11 and to the upper and lower bead breaking shoes 14 and 16, respectively.

In operation of the machine 10, the normal position and relation of the elements are illustrated in full line in FIG. 2. The upper bead breaking shoe 14 is positioned in engagement against the upper side wall 93 of the tire 24, adjacent the upper bead 94 which securely grips the wheel within a groove 96 contiguous with rim flange 97. Likewise, the lower bead breaking shoe 16 engages the lower side wall 98 of the tire 24 substantially diametrically opposite the upper shoe 14. The lower bead 99 grips the wheel within a groove 101 contiguous with the lower rim flange 102.

Figure 3:
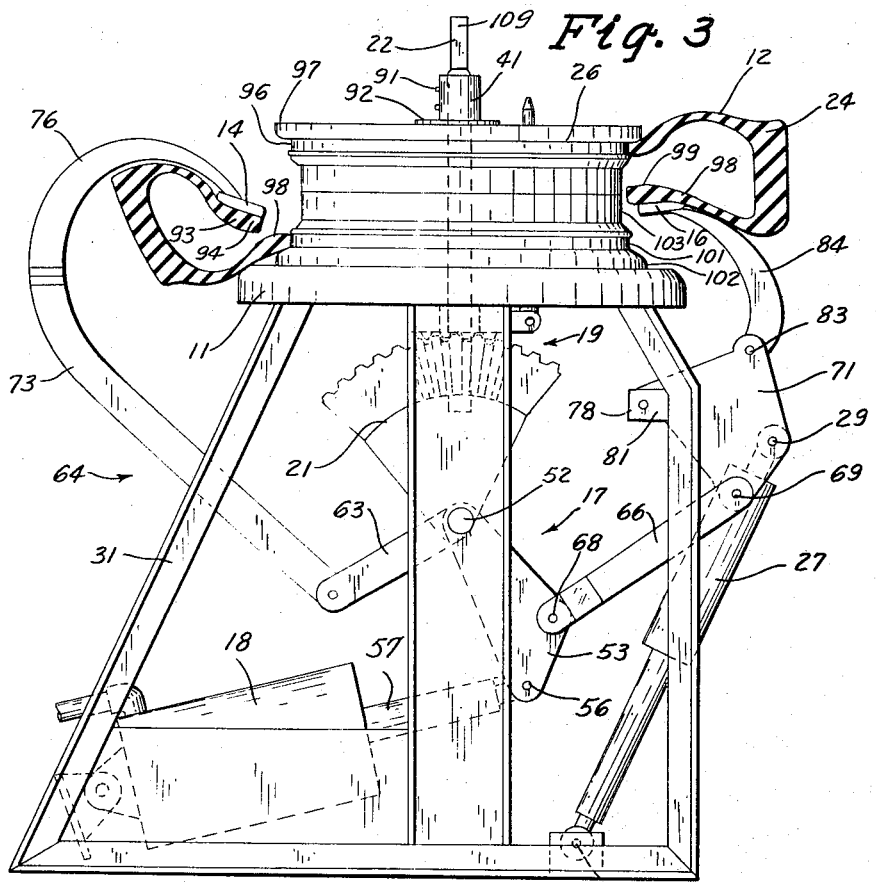
FIG. 3 is a view similar to FIG. 2 but with the parts in their actuated, operative positions.

Upon actuation of the piston and cylinder assembly 18, the extension of the piston rod 57 causes a pivotal movement of the plates 53 and 54 to the position best illustrated in FIG. 3. The movement of the plates 53 and 54 is transmitted simultaneously by the links 66 and 67 to the lower shoe 16, by the links 62 and 63 and link arms 73 and 74 to the upper shoe 14, and by the gear segment 21 to the shaft 22.

Resulting movement of the lower shoe 16 is upward to the position of FIG. 3 where the lower bead 99 is broken out of the groove 101 and into the drop center 103 of the wheel rim 26. Resulting movement of the upper shoe 14 is downward simultaneously with the upward movement of the lower shoe 16, effecting the breaking away of the upper bead 94 (FIG. 3) out of the groove 96 and toward the drop center.

It will be noted that the movement of the rocker plates 71 and 72 as a result of the piston rod actuation effects an extension of the shock absorber 27 (FIG. 3). The absorber 27 permits but a limited movement of the rocker plates, and thus of the linkage arrangement 17, protecting thereby over-acceleration by the piston and cylinder assembly 18 which could damage the beads 94 and 99.

After the beads have been broken as described and as illustrated in FIG. 3, the assembly 18 is operable to retract the piston rod 57 and to return the elements to their FIG. 2 positions. To complete the breaking of the beads away from the wheel rim 26, the combination tire mounting and demounting tool 23 (FIGS. 6 and 7) is utilized.

This tool 23 includes adjacent one end 105 a roller 106 rotatably mounted thereon, an upturned lip 107 at the other end complemented by a curved lip 108 extended oppositely therefrom, and includes further an elongated slot 104 of a width slightly more than the width of the squared portion 109 of the top of the shaft 22.

The tire mounting and demounting tool 23 is thus placeable in cooperative engagement with the shaft portion 109 inserted into the slot 104. Thus, with the tool end 105 inserted between the upper bead 94, which has been forced outwardly of the upper flange 97 as illustrated in FIG. 6, and the flange 97, operation of the piston and cylinder device 18 to again extend its piston rod 57 to the FIG. 3 position effects via the gear segment 21 and gear 87 rotation of the shaft 22 and like rotation of the tire tool 23 relative to the wheel 24. This rotation of the tool 23 as positioned in FIG. 6 thereby results in complete withdrawal of the upper bead 94 over and away from the rim flange 97.

To complete the removal of the lower bead 99, the tire tool 23 is removed from its driving connection with the shaft 22, the cone 92 is threaded off the sleeve 41, the tire and wheel assembly 12 is lifted off the table 11, turned over, and replaced thereon and recentered by the cone 92. The operation is then repeated for the lower bead 99 as described with respect to FIG. 6.

Should it be desired to remount the tire 24 to the wheel 26, with the arrangement as depicted in FIG. 7, the tool 23 is again drivingly engaged with the shaft portion 109. The curved lip 108 extends over and downwardly about the flange 97, and the upper lip 107 extends up and over the tire bead, the upper bead 94 for example. By this arrangement, rotation of the shaft 22 and the tire tool 23 in the correct predetermined direction, by operation of the fluid actuated piston and cylinder device 18, results in disposing the upper bead 94 below the flange 97 and into the drop center 103 prior to compression.

In summary, a tire handling machine has been disclosed and described herein which effects, by but a sequential operation of a single power device, a simultaneous breaking of both upper and lower beads, and with the cooperation of a specially adapted tire tool, either a complete demounting of the uppermost bead, or a complete remounting thereof, without repositioning or moving the tire and wheel assembly.

Some changes may be made in the construction and arrangement of my tire handling machine without departing from the real spirit and purpose of my invention, and it is my intention to cover by my claim, any modified forms of structure or use of mechanical equivalents which may be reasonably included within their scope.

I claim:

A machine for handling a tire and wheel assembly comprising in combination,
    a wheel support,
    ground engaging supporting means for supporting said wheel support,
    shoe elements movable against the beads of a tire on said wheel support to break the beads away from the rim of a wheel upon which such tire is mounted, an upright shaft mounted within said supporting means and extending upwardly through said wheel support, a gear element on said shaft, power means on said supporting means, linkage means operatively connecting said shoe elements and said power means whereby said power means can move said linkage means and said shoe elements, and a second gear element rigidly secured to said linkage means and being in mesh with the gear element on said shaft.

References Cited

UNITED STATES PATENTS

| | | | |
|---|---|---|---|
| 1,445,784 | 2/1923 | Mayer et al. | 157—1.24 |
| 2,569,789 | 10/1951 | Weaver | 157—1.24 |
| 2,695,659 | 11/1954 | Athmann | 157—1.24 |
| 3,032,094 | 5/1962 | Bishman | 157—1.28 |
| 3,255,801 | 6/1966 | Tabordon | 157—1.28 |

GRANVILLE Y. CUSTER, JR., *Primary Examiner.*